US012109594B2

(12) United States Patent
Stirnimann

(10) Patent No.: US 12,109,594 B2
(45) Date of Patent: Oct. 8, 2024

(54) INSPECTION PROCESS

(71) Applicant: WILCO AG, Wohlen (CH)

(72) Inventor: Christian Stirnimann, Regensdorf (CH)

(73) Assignee: WILCO AG, Wohlen (CH)

( * ) Notice: Subject to any disclaimer, the term of this patent is extended or adjusted under 35 U.S.C. 154(b) by 0 days.

(21) Appl. No.: 16/972,940

(22) PCT Filed: Jun. 7, 2018

(86) PCT No.: PCT/EP2018/065078
§ 371 (c)(1),
(2) Date: Dec. 7, 2020

(87) PCT Pub. No.: WO2019/233587
PCT Pub. Date: Dec. 12, 2019

(65) Prior Publication Data
US 2021/0245203 A1 Aug. 12, 2021

(51) Int. Cl.
*B07C 5/34* (2006.01)
*B07C 5/00* (2006.01)
*B07C 5/342* (2006.01)
*B07C 5/344* (2006.01)
*B07C 5/36* (2006.01)
*G06V 10/20* (2022.01)

(52) U.S. Cl.
CPC ............ *B07C 5/3408* (2013.01); *B07C 5/344* (2013.01)

(58) Field of Classification Search
CPC ......... B07C 5/34; B07C 5/3408; B07C 5/344; B07C 5/3412; B07C 5/342; B07C 5/361
USPC .......................................................... 209/522
See application file for complete search history.

(56) References Cited

U.S. PATENT DOCUMENTS 3,923,158 A * 12/1975 Fornaa .................... B07C 5/126 209/555
4,378,493 A * 3/1983 Dorf ...................... G01N 21/90 250/216
4,691,830 A * 9/1987 Ahl ........................... C03B 9/41 65/29.12

(Continued)

FOREIGN PATENT DOCUMENTS

DE 19644163 A1 5/1998

OTHER PUBLICATIONS

Feb. 11, 2019 International Search Report issued in International Patent Application No. PCT/EP2018/065078.

(Continued)

*Primary Examiner* — Michael McCullough
*Assistant Examiner* — Molly K Devine
(74) *Attorney, Agent, or Firm* — Oliff PLC

(57) ABSTRACT

An inspection process including the steps of: providing at least one specimen to an inspection apparatus; identifying the at least one specimen; inspecting the at least one specimen; assigning a first assessment to the at least one specimen based on the result of the inspection; saving the identification feature together with the inspection data and a first assessment to a raw data storage as a data package; providing the processed data storage to an inspector; assigning the second assessment to the data space of the processed data package; sorting the at least one specimen based on the first or second assessment.

11 Claims, 2 Drawing Sheets

(56) References Cited

U.S. PATENT DOCUMENTS

| | | | | | |
|---|---|---|---|---|---|
| 6,292,709 | B1 * | 9/2001 | Uhl | B07C 3/00 209/584 |
| 7,607,545 | B2 * | 10/2009 | Daniel | B07C 5/122 209/523 |
| 8,577,145 | B2 * | 11/2013 | Panetta | G06V 30/1434 348/148 |
| 2004/0218806 | A1 * | 11/2004 | Miyamoto | G06T 7/0004 382/145 |
| 2005/0027392 | A1 | 2/2005 | Elliot et al. | |
| 2007/0159179 | A1 * | 7/2007 | Park | G01N 21/95 324/500 |
| 2017/0154417 | A1 * | 6/2017 | Niedermeier | H04N 13/254 |

OTHER PUBLICATIONS

Feb. 11, 2019 Written Opinion of the International Searching Authority issued in International Patent Application No. PCT/EP2018/065078.

* cited by examiner

INSPECTION PROCESS

TECHNICAL FIELD OF THE INVENTION

The current invention relates to an inspection process, particularly for the optical inspection of pharmaceutical products.

DESCRIPTION OF THE RELATED ART

Known embodiments of such inspection processes use automatic visual inspection apparatus (AVI) with cameras to detect defects, for example defects in containers or particles within containers. Faulty products can be sorted out to a rejection path. Due to the image quality, the inclusion of bubbles in the liquid in a container or other interferences, a considerable number of products are mistakenly labelled as being faulty. To reduce these numbers, specific features can be used to supply faulty labelled products to a retest path. These products are subsequently checked by a trained inspector or a semi-automatic apparatus, which perform a final pass/fail evaluation. For this, the products to be retested must be supplied to an inspection process, once again. This is time consuming and inefficient.

SUMMARY OF THE INVENTION

In the current invention, it is a task to provide an inspection process, with which the above-mentioned drawbacks can be prevented.

This task is solved by a process with the features of claim 1. Further embodiments of the process, as well as an inspection system are defined by the features of further claims.

An inspection process according to the invention comprises the steps of:

- providing at least one specimen to an inspection apparatus;
- identifying the at least one specimen;
- transmitting the identification feature to a control system;
- inspecting the at least one specimen;
- assigning the inspection data to the at least one specimen;
- assigning a first assessment to the at least one specimen based on the result of the inspection;
- saving the identification feature together with the inspection data and a first assessment to a raw data storage as a data package;
- sorting the at least one specimen based on the first assessment;
- processing the data package in preparation of a virtual inspection by an inspector;
- providing the processed data package with a data space for a second assessment;
- saving the processed data package to a processed data storage;
- providing the processed data storage to the inspector;
- assigning the second assessment to the data space of the processed data package;
- saving the processed data package together with the second assessment to a result data storage;
- sorting the at least one specimen based on the second assessment.

For example, the specimen can be an empty container or a container containing a liquid, for example a pharmaceutical container, such as a vial, a bottle, a syringe, an ampoule, a carpule, an infusion bag, an infusion bottle, a BFS-ampoule (blow-fill-seal manufactured), a BFS-bottle, a blister, a tablet blister, an Autoinjector, a Metered-dose inhaler (MDI). All these containers can be made from glass or plastic. The content of such a container can be a fluid, such as a liquid, a gel or a gas. Alternatively, the content may be lyophilized material or a powder or a suspension. The inspection apparatus can comprise an inlet comprising a conveyor, a reading and/or marking unit, an inspection, a sorting unit, a control system, a storage system and an outlet comprising at least one path comprising a conveyor. The identifying can be done before or after the inspecting. The inspecting of the specimen, the assigning of the inspection date, the assigning of a first assessment and the saving to a raw data storage can be done once or can be done repeatedly. For example, a first area of interest can be inspected in one inspection station and a second area of interest can be inspected in another inspection station. Alternatively, if the first inspection produced an ambiguous result, the first inspection can be repeated. It is also possible to have several stages of first inspections, i.e. to have a level one inspection and if the level one inspection is ambiguous, to have a more extensive level two inspection. The area of interest or the region of interest, is defined as the area or region, in which a defect can be expected and thus is inspected. The sorting, based on the first or second assessment, can be done after the inspecting or later and with another inspection apparatus, respective sorting apparatus. The raw data storage, the processed data storage and the result data storage can be different entities, or they can be identical or can be stored on an identical device.

In an embodiment, the first assessment can be selected from the group comprising pass, reject and retest. It is possible to foresee more than one retest assessment. For example, a further assessment could be retest, because there might be an undesired particle in the container or because the container itself comprises an undesired inclusion or has a defect, such as scratches or bumps. In general, intrinsic, extrinsic and inherent defects can be detected and can serve as a basis for the first assessment.

Possible particle inclusions may comprise metal, plastic, fibers, hairs or the like. If no defects have been detected, the specimen receives the assessment pass. If one or more clear defect has been detected, the assessment is reject. It is possible to categorize the defects, such as particle rejection or cosmetic rejection, i.e. cap defects or defects in the side wall or bottom of a container. The assessment can be retest, if, for example, a plurality of inclusions has been detected. In this case, there can be in fact a plurality of inclusions or there can be only air bubbles within the container. Alternatively, if there is an incorrect position correction, i.e. the test window could not be positioned correctly, the assessment is also set to retest. If the tracking of an object doesn't allow for a clear identification, i.e. bubble or particle, the assessment is also set to retest.

In an embodiment, the second assessment can be selected from the group comprising pass, reject and further. Obviously, the second assessment can comprise the same assessments as the first assessment but can also comprise further assessments.

In an embodiment, the first assessment and/or the second assessment comprises a classification. It is possible to classify the defects and use the classification for sorting the specimen. For example, all rejected specimen and/or specimen to be retested can be sorted by classification. The data of the retested specimen, i.e. the data from the second assessment can be used to improve the first assessment. The specimen that received the first assessment pass can also comprise a classification, for example, specimen foreseen for random inspection. The random inspection of good products can be used to guarantee the quality of the assessment process.

In an embodiment, the identifying is done by detecting a provided identification feature on the at least one specimen and/or by applying an identification feature to the at least one specimen. Generally, any identification feature is possible, that allows the individual identification of each specimen.

In an embodiment, the identification feature can be selected from the group comprising alphanumeric code, matrix code, bar code, Inkjet coding, laser coding, electronic coding on a chip. Other identification features such as RFID are also possible.

In an embodiment, the identification feature is an electronic coding on a chip and wherein the chip comprises the raw data storage, the processed data storage and the result data storage. The above-mentioned storages can be part of a single storage or can be part of storages that are separate from one another.

In an embodiment, the inspecting comprises the steps of:
- taking a picture of the at least one specimen; and
- assessing the taken pictures based on predefined criteria.
  The taking of a picture can be done by a camera. It is possible to use a camera for the detection of visual light, infrared light, ultraviolet light or other electromagnetic radiation, such as x-ray.

The taking of a picture may comprise the taking of a sequence of pictures, i.e. several pictures or a movie. It is possible to rotate the specimen to be able to take pictures from the specimen from all directions. It is possible to use any means to set inclusions into motion, such as vibration or stimulation by sound.

In an embodiment, the processing comprises the steps of:
- identifying critical areas of the at least one specimen based on the taken picture and the predefined criteria; and
- emphasizing the critical areas in the taken picture.

Any processing step can be done that simplifies the inspection of the critical areas by a human inspector. For example, in the case the specimen has been rotated during the inspection and pictures have been taken from all directions, the sequence of pictures can be joined to form a flat projection of the surface of the specimen. For example, after each picture, the specimen is rotated by 60 degrees and a total of six pictures is taken to cover a 360 degrees view of the specimen. However, any number of pictures with a corresponding angular rotation of the specimen is possible. It is possible to take more pictures with a smaller image area to obtain a higher resolution of the overall picture. Alternatively, overlapping pictures can be taken to increase the quality of the overall picture.

In an embodiment, the emphasizing is done by marking the critical areas and/or by enlarging the critical areas and/or by increasing the contrast of the critical areas and/or by applying a color filter to the critical areas. In the case, where several pictures have been taken or a movie has been recorded, all static elements can be eliminated by means of a subtraction process, and the moving elements can be highlighted. This is particularly suitable for particle inspection.

The features of the above-mentioned embodiments of the inspection process can be used in any combination, unless they contradict each other.

An inspection system according to the invention comprises
- at least one inspection apparatus with an inlet for specimen to be inspected,
- at least one reading and/or marking unit for identifying the specimen to be inspected,
- at least one control system,
- an inspection for inspecting the specimen,
- at least one sorting unit with at least three outlets, wherein each specimen can be directed to one of the at least three outlets, based on the result of the inspection,
- a raw data storage for storing a data package comprising the identification of the specimen, the inspection data and a first assessment, based on the result of the inspection,
- a processor for processing the data package,
- a processed data storage for storing the processed data package,
- a virtual inspection with a workspace for an inspector, who assigns a second assessment to the processed data package and
- a result data storage for storing the processed data package together with the second assessment.

BRIEF DESCRIPTION OF THE DRAWINGS

Embodiments of the current invention are described in more detail in the following with reference to the figures. These are for illustrative purposes only and are not to be construed as limiting. It shows FIG. 1 a schematic depiction of a first inspection apparatus according to the invention.

DETAILED DESCRIPTION OF THE INVENTION

Figure 1:
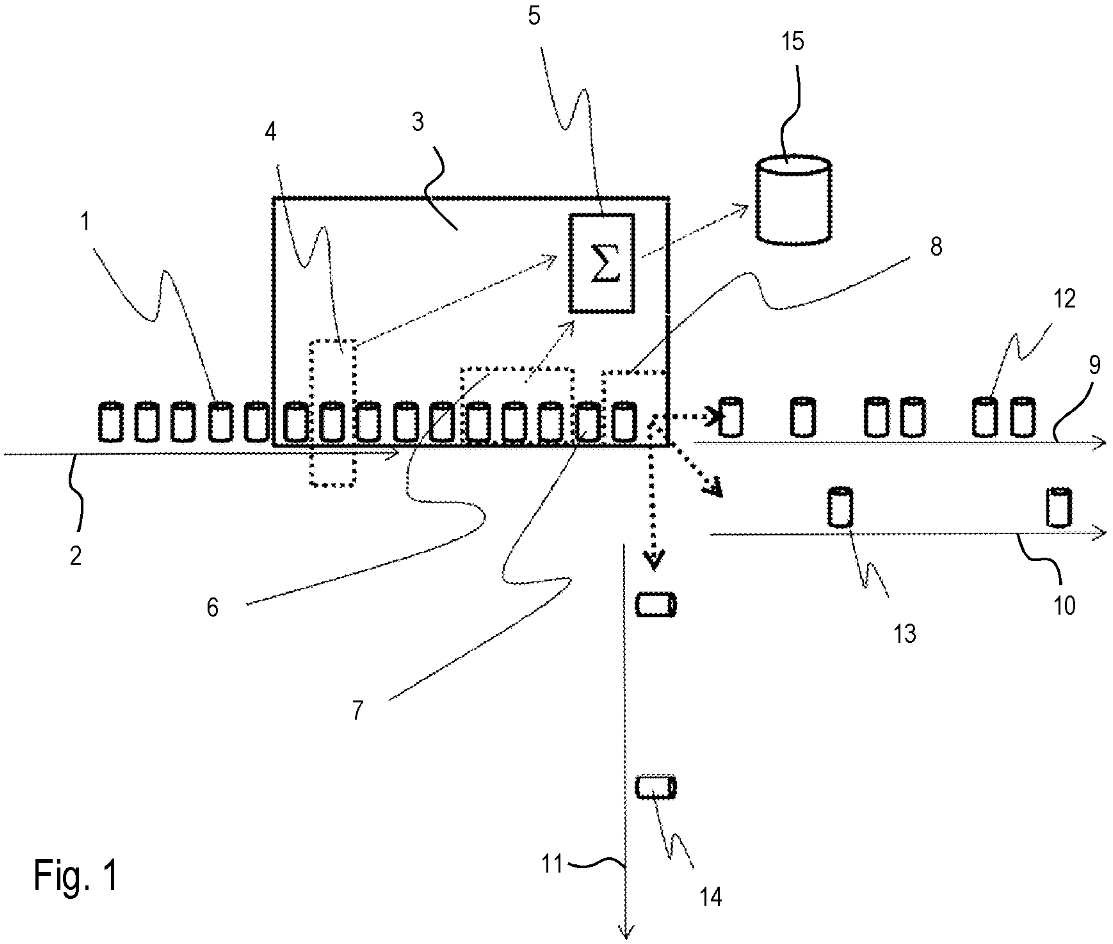

FIG. 1 shows a schematic depiction of a first inspection apparatus 3 according to the invention. The first inspection apparatus 3 comprising an inlet 2 for providing uninspected specimen 1, in the depicted case containers 1 to a reading/marking unit 4, where the specimen 1 can be identified, for example by detecting an identification feature on the container or by applying an identification feature to the container. The identification feature is transmitted to a control system 5. From the reading/marking unit 4, the still untested containers 1 are transported to an inspection 6, where the specimen 1 are inspected by an automatic visual inspection (AVI). The inspection is carried out by taking an optical picture of the container 1, assigning the inspection data in the form of the taken picture to the respective container 1 and by comparing the taken picture with predefined criteria. Based on this comparison, a first assessment is made, and its result is assigned to the respective container 1. In the depicted case the first assessment comprises pass, reject and retest. The identification feature together with the inspection data and a first assessment are saved to, respectively stored in a raw data storage 15 as a data package. The first inspection apparatus 3 further comprises a sorting unit 8, which sorts the containers 1 (i.e., inspected specimen 7) based on the result of the inspection, i.e. based on the first assessment. The containers that received the assignment pass (i.e., pass specimen 12) will be guided to the pass path 9 and the containers that received the assignment reject (i.e., reject specimen 13) will be guided to the reject path 10. Only the containers on the pass path 9 meet the predefined requirements and are allowed for further use. The rejected containers will be excluded from further use. The container that received the assignment retest (i.e., retest specimen 14) will be guided to the retest path 11. From there, they will be conveyed to a retest area or they will be temporarily stored before they are transported to a retest area. It would also be possible to guide all containers to the same path and do the sorting at a later stage. This is possible, as each container has an individual identification feature and each individual assessment has been assigned to its container. The reading/marking unit 4, the inspection 6, the sorting unit 8, the raw data storage 15, the conveying of the containers 1 at the inlet 2 and within the first inspection apparatus 3, as well as the conveying of the pass path 9, the reject pass 10 and the retest path 11 are operatively connected to the control system 5. The operative connection can be cable-based or wireless.

Figure 2:
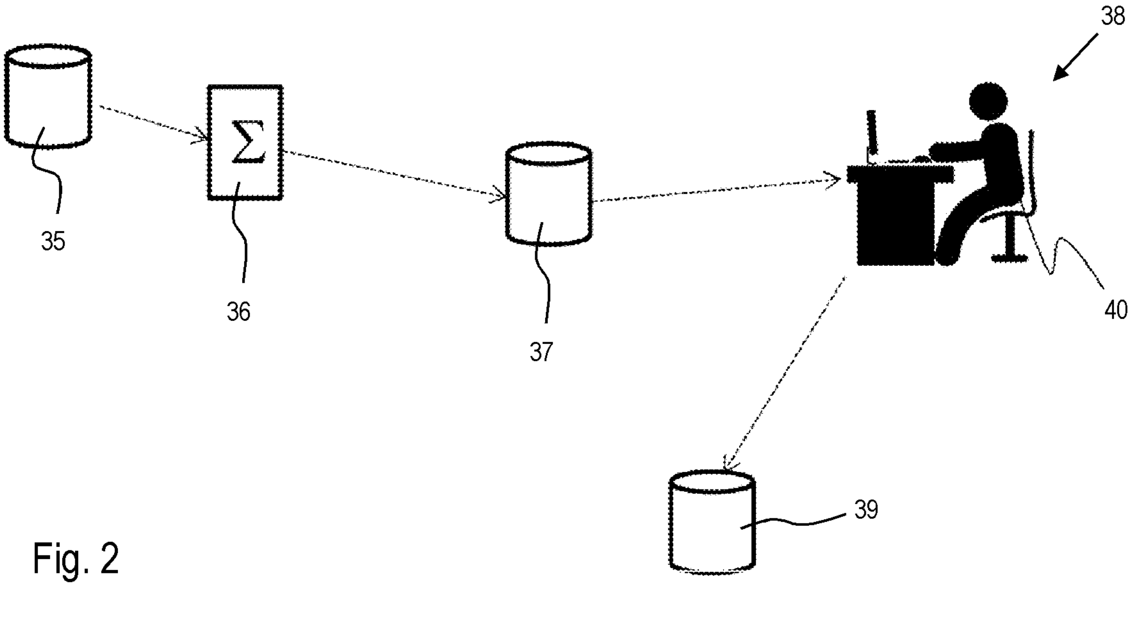
FIG. 2 a schematic depiction of the virtual inspection according to the invention.

FIG. 2 shows a schematic depiction of the virtual inspection according to the invention. The virtual inspection can be performed remote from the first inspection apparatus 3. The raw data storage 15, respectively the data saved on the raw data storage 15 needs to be provided to the virtual inspection. To emphasize this, the raw data storage has been given a new reference number, i.e. 35. A processor 36 extracts relevant information from the data packages contained on the raw data storage 35. The existing information can be depicted differently, or additional information can be added. The goal of the processing is to provide the inspector with optimized date for him to analyze. The processed data, i.e. the processed data package is subsequently saved to a processed data storage 37. The processed data storage 37 can be identical to the raw data storage 35. The processing and saving, respective storing can be done at the first inspection apparatus 3, controlled by the control system 5 or it can be done remote from the first inspection apparatus 3. Each processed date is inspected and assessed individually in an inspection 38 by a human inspector 40. The inspector assigns a second assessment to each processed data package. The second assessment can be pass, reject or other, wherein other can also be retest or use for training. The second assessment, together with the data processed data package are saved to a result data storage 39. The result data storage 39 can be identical with the processed data storage 37, respectively with the raw data storage 35. The reading and saving of the data package can be done by a computer, such as a desktop, a laptop, a tablet, a smart phone or the like.

Figure 3:
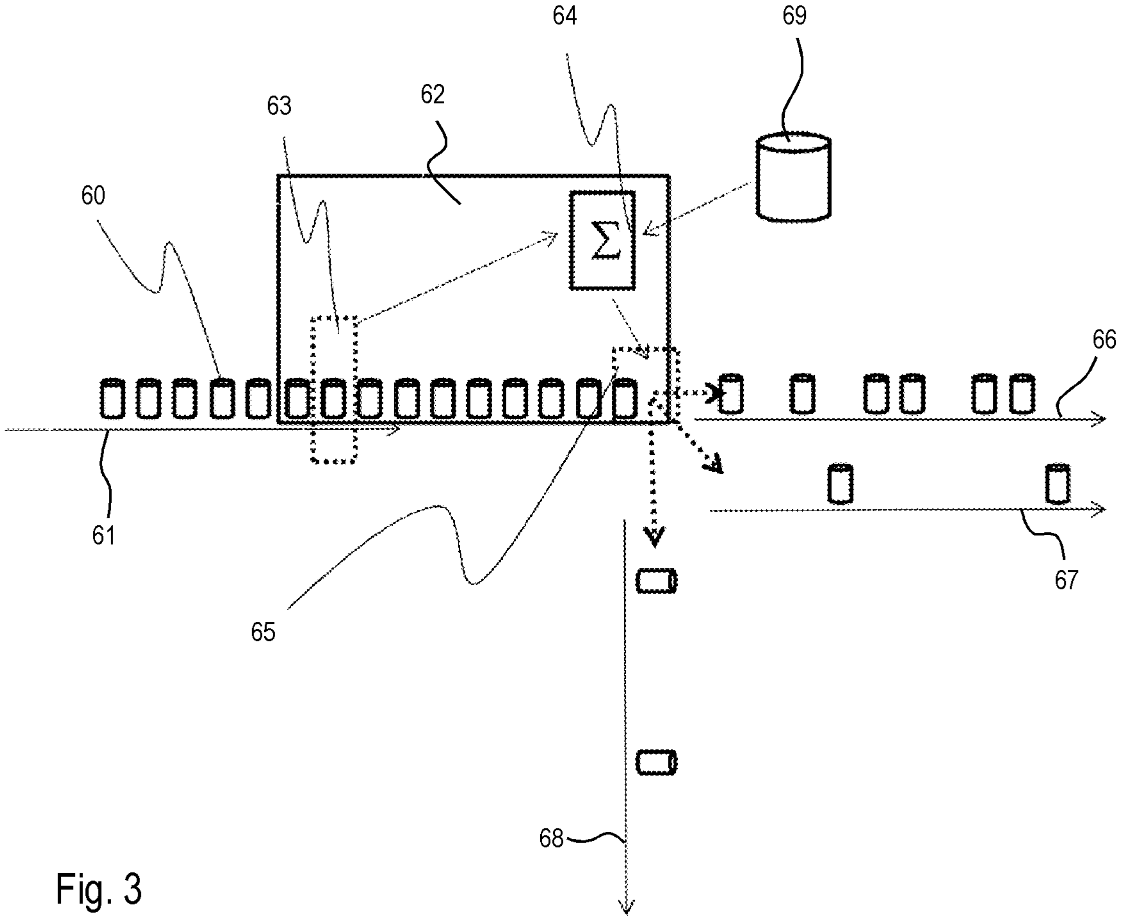
FIG. 3 a schematic depiction of a second inspection apparatus according to the invention.

FIG. 3 shows a schematic depiction of a second inspection apparatus 62 according to the invention. The retested specimen 60 are provided to the second inspection apparatus 62 by the inlet 61. A reading unit 63 is arranged in the second inspection apparatus 62 adjacent to the inlet 61. The data from the reading unit 63 is transmitted to a control system 64, allowing the identification of each container 60. The control system 64 causes a sorting unit 65, which is arranged after the reading unit 63 in the conveying direction, to sort the containers 60 according to the second assessment assigned to each container. The control system 64 obtains the second assessment from the result data storage 69. Again, to emphasize the independency of the virtual inspection and the second inspection apparatus 62, the result data storage 39 from FIG. 2 has been given a new reference number, namely 69. Based on the second assessment, the containers are sorted to the pass path 66, the reject path 67 or the further path 68. The further path can be another retest path. It is possible that the second inspection apparatus 62 is identical to the first inspection apparatus 3. The reading unit 63, the sorting unit 65, the result data storage 69, the conveying of the containers 60 at the inlet 61 and within the second inspection apparatus 62, as well as the conveying of the pass path 66, the reject pass 67 and the further path 68 are operatively connected to the control system 64. The operative connection can be cable-based or wireless.

REFERENCE SIGNS LIST

1 Specimen
2 Inlet
3 first inspection apparatus
4 Reading/marking unit
5 Control
6 Inspection
7 inspected specimen
8 Sorting unit
9 Pass path
10 Reject path
11 Retest path
12 Pass specimen
13 Reject specimen
14 Retest specimen
15 Raw data storage
35 Raw data storage
36 Processor
37 Processed data storage
38 Virtual inspection
39 Result data storage
40 Inspector
60 Retest specimen
61 Inlet
62 second inspection apparatus
63 Reading unit
64 Control
65 Sorting unit
66 Pass path
67 Reject path
68 Further path
69 Result data storage

The invention claimed is:

1. An inspection process comprising the steps of:

providing at least one container to be inspected to an automated inspection apparatus;

identifying the at least one container by an identification feature via the automated inspection apparatus;

transmitting the identification feature of the at least one container to a control system;

inspecting a material comprising the at least one container or contents of the at least one container by the automated inspection apparatus for defects in the material or the contents of the at least one container and creating, by only the automated inspection apparatus based only on an inspection resulting from the inspecting, inspection data (i) from the result of the inspection and (ii) that is different from the identification feature;

assigning the inspection data to the at least one container;

assessing the inspection data and assigning a first assessment to the at least one container based on the result of the assessing that is different from the identification feature and the inspection data;

saving the identification feature, the inspection data and the first assessment to a raw data storage as a data package;

sorting the at least one container, with a sorting unit having at least three alternative outlets at a single location, to (i) a pass path via a first outlet of the at least three alternative outlets if the first assessment meets first predefined criteria, (ii) a reject path via a second outlet of the at least three alternative outlets if the first assessment meets second predefined criteria or (iii) a retest path via a third outlet of the at least three alternative outlets if the first assessment meets third predefined criteria;

processing the data package in preparation of a virtual inspection by an inspector;

providing a processed data package resulting from the processing with a data space for a second assessment based on a second inspection of the at least one container that is separate from a first inspection of the at least one container;

saving the processed data package to a processed data storage;

providing the processed data storage to the inspector;

assigning the second assessment to the data space of the processed data package;

saving the processed data package together with the second assessment to a result data storage; and sorting the at least one container based on the second assessment to one of another pass path, another reject path and a further path, wherein:

the first predefined criteria is met when the material or the contents do not have any of the defects;

the second predefined criteria is met when the material or the contents clearly have one or more of the defects;

the at least one container, if in the pass path, is cleared for further use; and the at least one container, if in the reject path, is precluded from further use.

2. The process according to claim 1, wherein the first assessment and/or the second assessment comprises a classification.

3. The process according to claim 1, wherein the identifying is done by detecting a provided identification feature, as the identification feature, on the at least one container and/or by applying the identification feature to the at least one container.

4. The process according to claim 3, wherein the identification feature is selected from the group comprising alphanumeric code, matrix code, bar code, Inkjet coding, laser coding, and electronic coding on a chip.

5. The process according to claim 4, wherein the identification feature is the electronic coding on the chip, and the chip comprises the raw data storage, the processed data storage and the result data storage.

6. The process according to claim 1, wherein the inspecting comprises the steps of:

taking a picture of the at least one container; and assessing the taken picture based on predefined criteria.

7. The process according to claim 6, wherein the processing comprises the steps of:

identifying critical areas of the at least one container based on the taken picture and the predefined criteria; and emphasizing the critical areas in the taken picture.

8. The process according to claim 7, wherein the emphasizing is done by enlarging the critical areas and/or by increasing the contrast of the critical areas and/or by applying a color filter to the critical areas.

9. An inspection system for carrying out the inspection process of claim 1, the inspection system comprising the automated inspection apparatus that includes:

at least one reading and/or marking unit configured to identify the at least one container; and an inspection unit configured to inspect the at least one container for the defects and create the inspection data, the control system, the sorting unit having the at least three alternative outlets, the raw data storage for storing the data package comprising the identification feature, the inspection data and the first assessment, a processor for processing the data package, the processed data storage for storing the processed data package, a virtual inspection station with a workspace for the inspector, who assigns the second assessment to the processed data package, and the result data storage for storing the processed data package and the second assessment.

10. The process according to claim 1, wherein the creating inspection data by inspecting the at least one container for defects includes at least one of (i) inspecting the at least one container for an unwanted particle inside of the at least one container, (ii) inspecting the at least one container for an unwanted inclusion in the at least one container, and (iii) inspecting the at least one container for a cosmetic defect.

11. The process according to claim 1, further comprising the step of re-inspecting the at least one container sorted into the retest path by the automated inspection apparatus or a second automated inspection apparatus.

* * * * *